United States Patent
Sensui

(10) Patent No.: US 6,188,846 B1
(45) Date of Patent: Feb. 13, 2001

(54) OPTICAL SYSTEM FOR FOCUS DETECTING DEVICE

(75) Inventor: Takayuki Sensui, Tokyo (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/412,508

(22) Filed: Oct. 5, 1999

(30) Foreign Application Priority Data

Oct. 9, 1998 (JP) ................................................ 10-288380

(51) Int. Cl.⁷ .................................................. G03B 13/36
(52) U.S. Cl. .............................................................. 396/114
(58) Field of Search .................................... 396/114, 111, 396/89; 250/201.8, 201.6, 201.2

(56) References Cited

U.S. PATENT DOCUMENTS

| | | | |
|---|---|---|---|
| 4,544,255 | * 10/1985 | Utagawa | 396/114 |
| 4,954,701 | 9/1990 | Suzuki et al. | 250/201.8 |
| 5,017,005 | * 5/1991 | Shindo | 396/114 X |
| 5,155,518 | 10/1992 | Utagawa | 396/111 X |
| 5,229,807 | * 7/1993 | Karasaki et al. | 396/114 |
| 5,241,168 | 8/1993 | Sensui | 250/208.1 |
| 5,321,248 | 6/1994 | Sensui | 250/201.8 |
| 5,327,192 | 7/1994 | Sensui | 396/114 |
| 5,530,236 | 6/1996 | Sensui | 250/201.8 |
| 5,646,393 | 7/1997 | Sensui | 250/201.8 |
| 5,659,813 | * 8/1997 | Kusaka et al. | 396/111 X |

* cited by examiner

Primary Examiner—W. B. Perkey
(74) Attorney, Agent, or Firm—Greenblum & Bernstein, P.L.C.

(57) ABSTRACT

An optical system of a focus detecting device for detecting a focusing condition of a main lens with respect to an image taking plane. The optical system includes a focus detection area arranged on an equivalent image taking plane, a first deflecting element for deflecting the light from the main lens through the focus detection areas in a first direction, a condenser lens for converging the light deflected by the first deflecting element, a second deflecting element for deflecting the light through the condenser lens in a second direction opposite to the first direction, and a light receiving element for receiving the light deflected by the second deflecting element. The condenser lens is arranged such that the light transmits along about the meridional plane of the condenser lens.

6 Claims, 6 Drawing Sheets

OPTICAL SYSTEM FOR FOCUS DETECTING DEVICE

BACKGROUND OF THE INVENTION

The present invention relates to an optical system for a focus detecting device that is suitable to an optical apparatus such as a single-lens reflex camera.

FIG. 1 shows a conventional single-lens reflex camera 10. The camera 10 is provided with a taking lens 51 as a main lens to form an image onto a film 12. A TTL (Through-The-Lens) passive focus detecting device 21 is installed in a bottom portion of a camera body 11 of the single-lens reflex camera 10. A part of light passed through the taking lens 51 passes through a half-mirror portion 14 of a main mirror 13, and then the light is reflected by a sub-mirror 15 toward the focus detecting device 21. In FIG. 1, x-, y- and z-directions are defined. The z-direction is parallel to an optical axis of the taking lens 51, the x-direction is parallel to an equivalent optical axis of the taking lens 51 after reflection by the sub-mirror 15, and the y-direction is perpendicular to both of the x- and z-direction.

The focus detecting device 21 includes a box 21a in which a condenser lens 31, a mirror 25, a pair of separator lenses 27a and 27b and a line sensor 29 are arranged. The line sensor 29 has a great number of pixels that are aligned with the y-direction. The optical path in the focus detecting device 21 is also shown in FIG. 2 in a developed fashion. An opening 23 to define a focus detecting area is bored on the box 21a. The opening 23 is located at an equivalent film plane 17. The light entered from the opening 23 is converged by the condenser lens 31 and then reflected by the mirror 25. The separator lenses 27a and 27b divide the light reflected from the mirror 25 into two portions and form images on different areas 29a and 29b on the line sensor 29. In FIG. 2, light 21LC passes through the central area of the opening 23 and light 21LO passes through the peripheral area of the opening 23. Entrance pupils of the focus detecting device 21 is represented by ovals 21P. The entrance pupils 21P are defined as areas that are optically conjugate with the entrance pupils of the separator lenses 27a and 27b through the condenser lens 31 and the opening 23.

Since the correlation between the positions of the images formed on the line sensor 29 represents focusing condition of the taking lens 51 with respect to the film 12, the focusing condition can be detected by calculating output signals from the line sensor 29.

Downsizing of the camera requires a compact design of the focus detecting device 21, which also requires decreasing the size of the box 21a. On the other hand, a predetermined optical path length must be kept in order to prevent overlapping of the separated images on the line sensor 29. If the optical path extends along a diagonal line of the box, it makes the most effective use of the confined space in the box of the focus detecting device.

FIG. 3 shows an optical system in an improved focus detecting device 22. A condenser lens 31 is provided at an opening 23 bored to a box 22a. The condenser lens 31 is decentered to the opposite side of a line sensor 29 with respect to the center of the opening 23, which deflects light 21L incident in the focus detecting device 22 toward the opposite direction to the line sensor 29. The deflected light is reflected by the mirror 25 to be incident on the line sensor 29 through the separator lenses 27a and 27b. FIG. 4 shows the deflecting function of the decentered condenser lens 31. The rectangular opening 23 is located at the peripheral portion of the condenser lens 31 as shown in FIG. 5 when the opening 23 is viewed along the optical axis O of the condenser lens 31.

The mirror 25 is diagonally opposite to the line sensor 29, which makes the optical path between the mirror 25 and the line sensor 29 extend along the diagonal line of the box 22a. This therefore makes the most effective use of the confined space in the box 22a of the focus detecting device 22.

However, the focus detecting device 22 has a disadvantage of mismatch between an exit pupil of the taking lens 51 and entrance pupils 21P of the focus detecting device 22 due to coma. The decentered arrangement of the condenser lens 31 causes coma in the light, and particularly, the longer the distance from the optical axis O is, the larger the coma becomes. Since the coma changes a deflecting angle of the passing light, the deflecting angle of the light 21LO passing the periphery of the opening 23 is larger than the deflecting angle of the light 21LC passing the center of the opening 23 as shown in FIG. 6. It is therefore, the entrance pupils 21P of the focus detecting device 22 are curved such that the peripheral portions bend upward as shown in FIG. 7, which may cause the mismatch between the exit pupil 51P of the taking lens 51 and the entrance pupils 21P of the focus detecting device 22.

In the example of FIG. 7, outside portions of the entrance pupils 21P represented by hatching are not within the exit pupil 51P, which results in the difference between the brightness distribution detected by the line sensor 29 and the actual brightness distribution, causing error in the focus detection. Thus, the decentered arrangement of the condenser lens 31 in the focus detecting device 22 only allows a narrow focus detection area in the center of the equivalent film plane 17 in order prevent the error in the focus detection.

SUMMARY OF THE INVENTION

It is therefore an object of the present invention to provide an optical system of a focus detecting device, which is capable of keeping a wide focus detection area with a compact construction.

For the above object, according to the present invention, there is provided an optical system of a focus detecting device for detecting a focusing condition of a main lens with respect to an image taking plane, which includes:

a focus detection area arranged on an equivalent image taking plane;

a first deflecting element for deflecting the light from the main lens through the focus detection area in a first direction;

a condenser lens for converging the light deflected by the first deflecting element, the condenser lens being arranged such that the light transmits along about the meridional plane of the condenser lens;

a second deflecting element for deflecting the light through the condenser lens in a second direction opposite to the first direction; and a light receiving element for receiving the light deflected by the second deflecting element.

With this construction, the optical path is once deflected in the first direction and then deflected in the second direction that is opposite to the first direction, which enables a diagonal arrangement of an optical path between the second deflecting element and the light receiving element in a box of the focus detecting device, making the most effective use of the confined space in the box. Further, the light travels along about the meridional plane of the condenser lens, which reduces the effect of the coma, matching the exit pupil of the main lens with the entrance pupils of the focus detecting device. As a result, the actual brightness distribution can be accurately detected by the light receiving element, even if the focus detecting device has a wide focus detection area.

The first deflecting element may be a prism and the second deflecting element may be a mirror. In such a case, the condenser lens is tilted with respect to an equivalent optical axis of the main lens on the main lens's side of the prism such that the light deflected by the prism transmits along about the meridional plane of the condenser lens.

The prism and the condenser lens may be independently arranged or these may be combined as a single condenser unit. One surface of the single condenser unit at the side of the focus detecting area may be a plane and the other surface thereof may be a curved surface.

DESCRIPTION OF THE ACCOMPANYING DRAWINGS

DESCRIPTION OF THE EMBODIMENTS

First Embodiment

Figure 1:
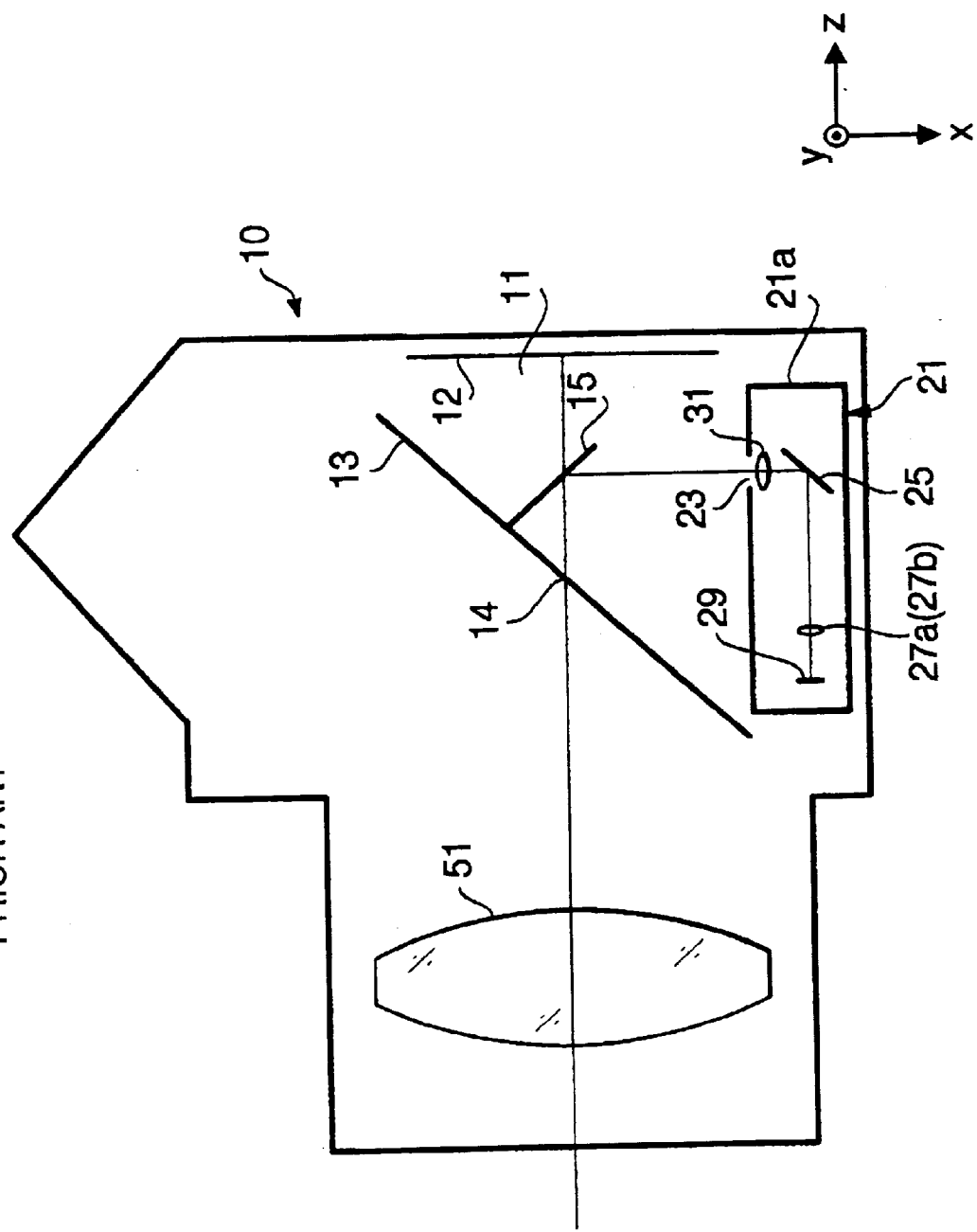
FIG. 1 shows an optical system of a single-lens reflex camera having a conventional focus detecting device.
Figure 2:
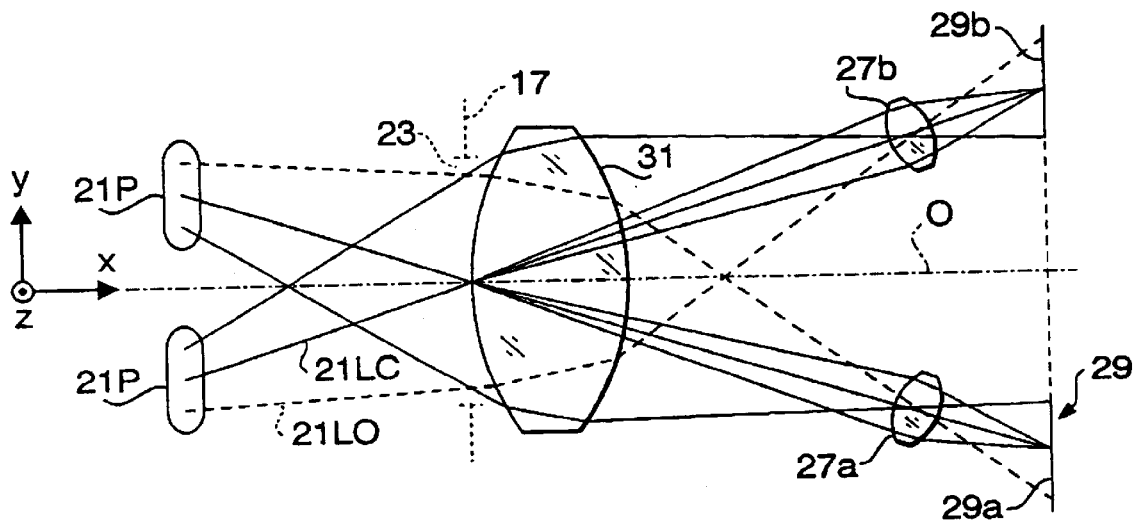
FIG. 2 shows an optical path in the focus detecting device of FIG. 1 in a development fashion.
Figure 3:
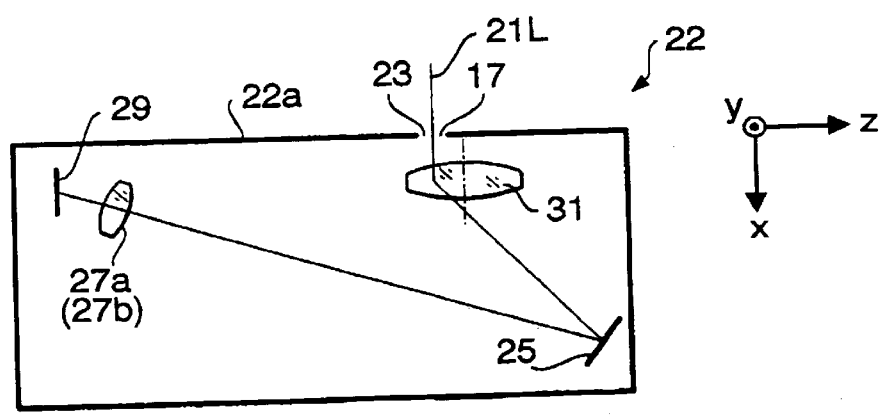
FIG. 3 shows an optical system of an another conventional focus detecting device.
Figure 4:
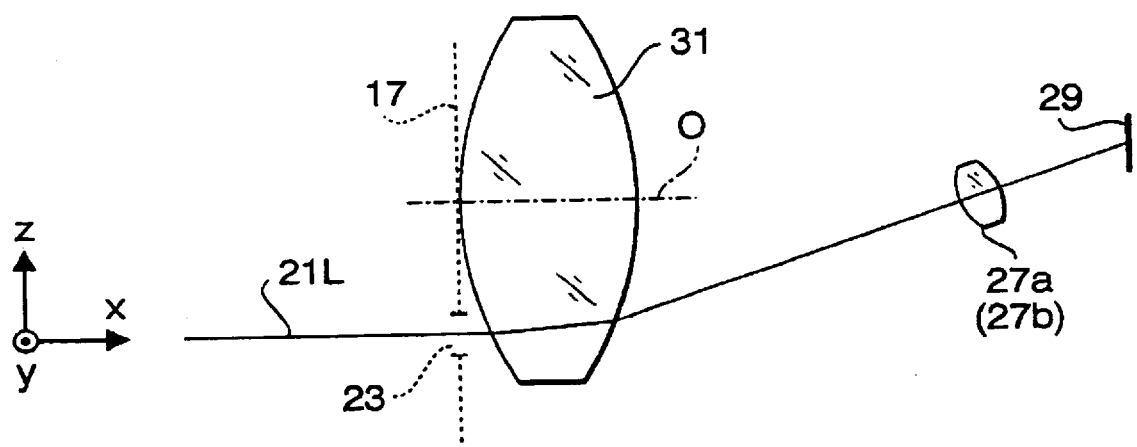
FIG. 4 shows a function of the decentered condenser lens in the focus detecting device of FIG. 3.
Figure 5:
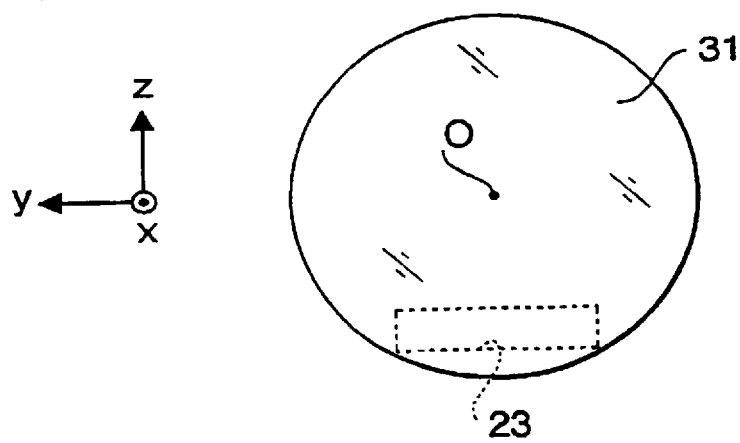
FIG. 5 shows relationship between an opening and the condenser lens in the focus detecting device of FIG. 3.
Figure 6:
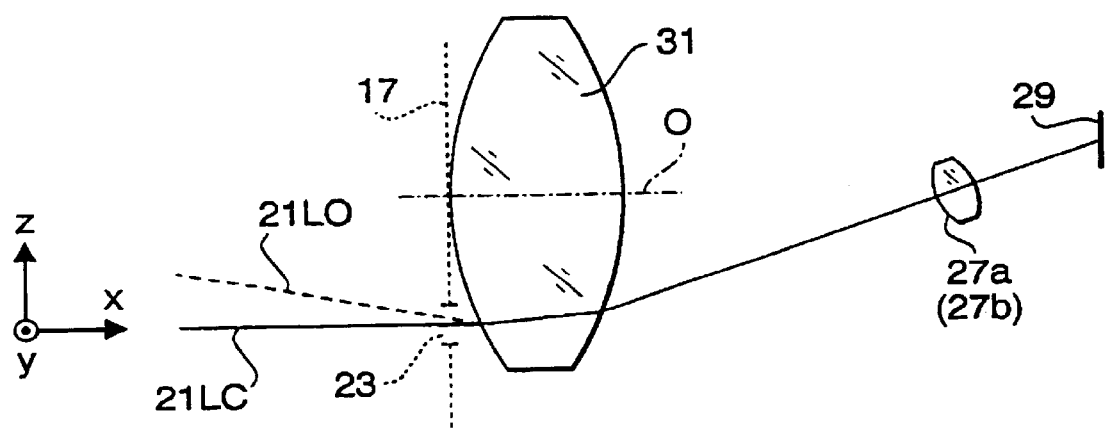
FIG. 6 shows effect of coma in the focus detecting device of FIG. 3.
Figure 7:
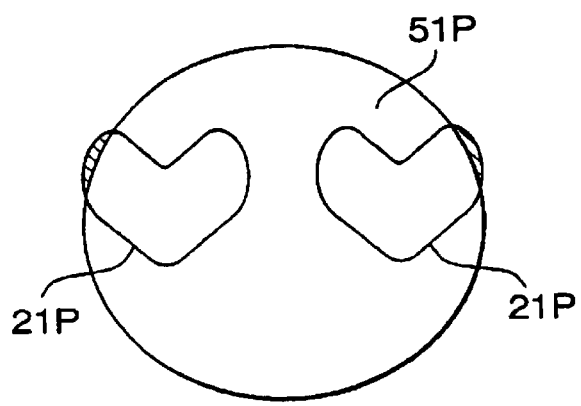
FIG. 7 shows a relationship between an exit pupil of the taking lens and entrance pupils of the focus detecting device of FIG. 3.
Figure 8:
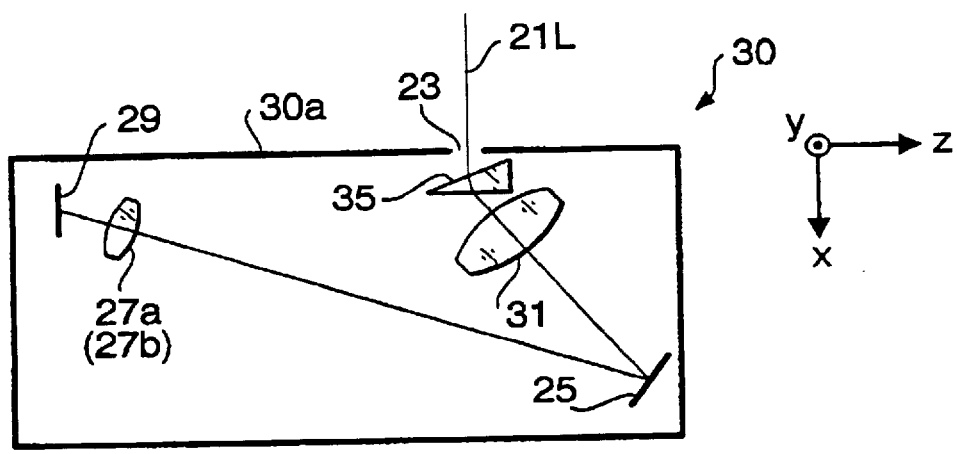
FIG. 8 shows an optical system of a focus detecting device according to a first embodiment of the present invention.

FIG. 8 shows an optical system of a focus detecting device 30 of a first embodiment. The focus detecting device 30 is used in a single-lens reflex camera as shown in FIG. 1, for instance. Definitions of x-, y- and z-directions in FIG. 8 are the same as that in FIG. 1. The focus detecting device 30 detects a focusing condition of a taking lens 51 (see FIG. 1) as a main lens with respect to a film 12 as an image taking plane. Light 21L travels along an optical axis of the taking lens and is incident on the focus detecting device 30. The light 21L is one of principal rays for the focus detecting device 30.

Figure 9:
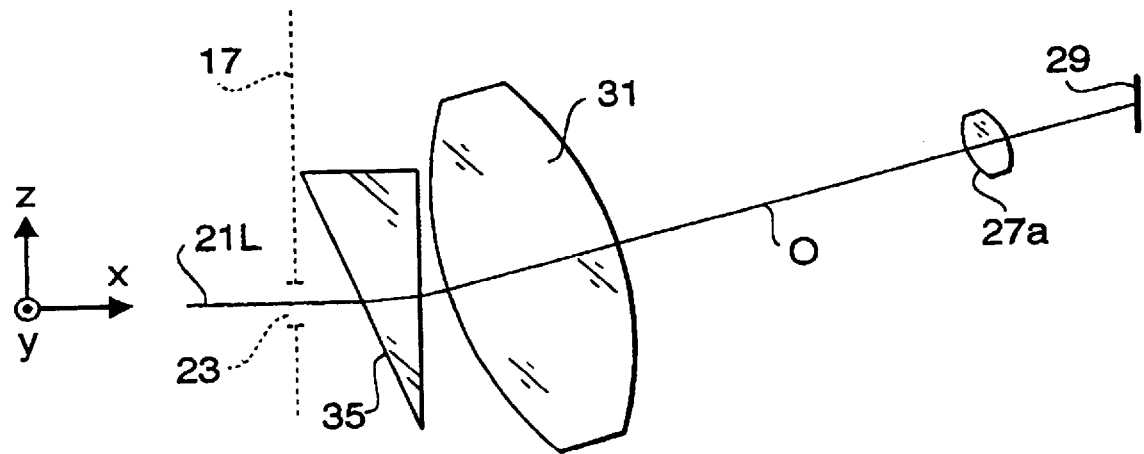
FIG. 9 shows an optical path in the focus detecting device of FIG. 8.

The focus detecting device 30 includes a box 30a in which a wedge prism 35, a condenser lens 31, a mirror 25, a pair of separator lenses 27a and 27b, and a line sensor 29. The line sensor 29 has a great number of pixels that are aligned in the y-direction. FIG. 9 shows an optical path in the focus detecting device 30 with omitting the mirror 25. An opening 23 is bored on the box 30a as a focus detection area, the opening 23 is arranged on an equivalent film plane 17.

The wedge prism 35 is a first deflecting element for deflecting the light from the taking lens through the opening 23 in a first direction that is opposite direction to the line sensor 29. In the other words, the first direction is different from the alignment direction of the pixels of the line sensor 29. The light 21L deflected by the wedge prism 35 is directed to the one corner of the box 30a.

Along the deflected optical path of the light 21L by the wedge prism 35, the condenser lens 31 is disposed for converging the deflected light by the wedge prism 35. In the first embodiment, the wedge prism 35 and the condenser lens 31 are independently arranged.

Figure 10:
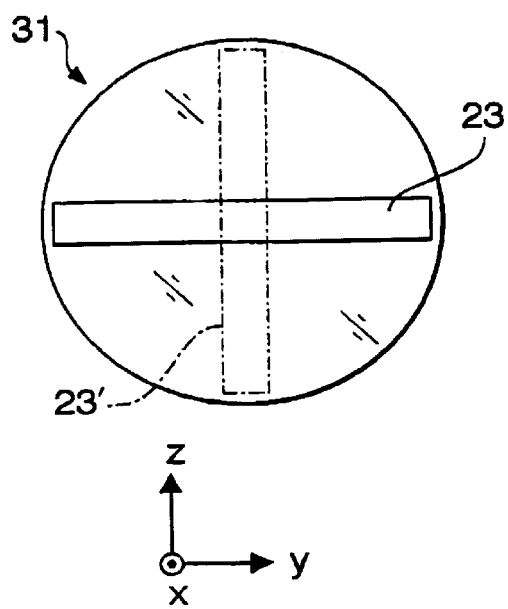
FIG. 10 shows relationship between an opening and the condenser lens in the focus detecting device of FIG. 8.

The condenser lens 31 is arranged such that the light 21L transmits along an optical axis O thereof. That is, the condenser lens 31 is tilted with respect to an equivalent optical axis of the taking lens, which is coincident with the light 21L before the deflection by the wedge prism 35. Further, since the opening 23 has a rectangular shape as shown in FIG. 10, the light transmits through the opening 23 passes the condenser lens 31 along about the meridional plane of the condenser lens 31. FIG. 10 shows the relationship between the opening 23 and the condenser lens 31 in contemplation of the function of the wedge prism 35. Since the light through the opening 23 pass the condenser lens 31 along about the meridional plane, the effect of the coma can be reduced.

The light converged by the condenser lens 31 is then reflected by the mirror 25. The mirror 25 is a second deflecting element for deflecting the light through the condenser lens 31 in a second direction opposite to the first direction. The light reflected by the mirror 25 is directed to the line sensor 29. The mirror 25 is located at one corner of the box 30a and the line sensor 29 at the diagonal corner of the box 30a, which enables a diagonal arrangement of an optical path between the mirror 25 and the line sensor 29 in the box 30a, making the most effective use of the confined space in the box 30a. That is, the predetermined optical path length can be kept with the compact device size.

The light reflected by the mirror 25 is divided by the separator lenses 27a and 27b into two portions and form images on different areas on the line sensor 29. The line sensor 29 is a light receiving element for receiving the light reflected by the mirror 25. Since the correlation between the positions of the images formed on the line sensor 29 represents focusing condition of the taking lens with respect to the film, the focusing condition can be detected by calculating output signals from the line sensor 29.

Figure 11:
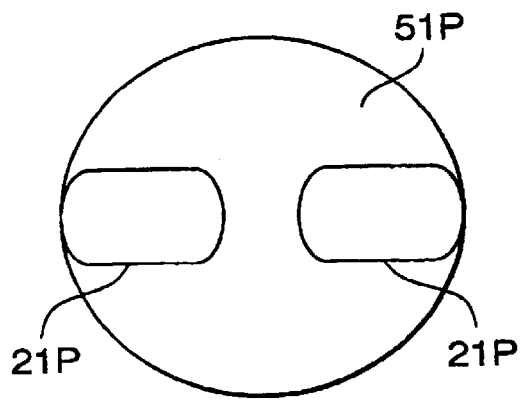
FIG. 11 shows a relationship between an exit pupil of the taking lens and entrance pupils of the focus detecting device of FIG. 8.

With the construction of the first embodiment, the light transmits along about the meridional plane of the condenser lens 31, which reduces the effect of the coma, matching the exit pupil 51P of the taking lens with the entrance pupils 21P of the focus detecting device 30. Namely, since the entrance pupils 21P are not curved, as shown in FIG. 11, these pupils can be within the exit pupil 51P even if the focus detecting device has a wide focus detection area. As a result, the actual brightness distribution can be accurately detected by the line sensor 29.

Second Embodiment

Figure 12:
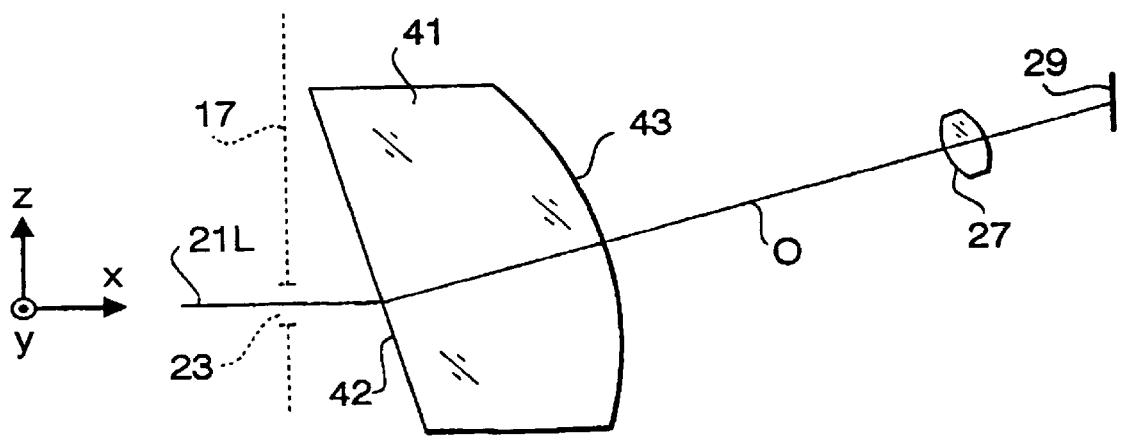
FIG. 12 shows an optical path in a focus detecting device according to a second embodiment of the present invention.

A second embodiment of the present invention will be described with reference to FIG. 12. In the second embodiment, the prism and the condenser lens are combined as a single condenser unit 41. The single condenser unit 41 has the same optical function with the combination of the prism 35 and the condenser lens 31 of the first embodiment. The other constructions of the second embodiment are the same as the first embodiment. The optical system of the second embodiment also includes the opening 23, the mirror 25, the separator lenses 27a and 27b, and the line sensor 29. FIG. 12, which is similar to FIG. 9, shows optical path of the focus detecting device according to the second embodiment with omitting the mirror 25.

As shown in FIG. 12, a first surface 42 of the single condenser unit 41 at the side of the opening 23 is a plane that is inclined with the equivalent film plane 17 to deflect the incident light towards the first direction. The second surface 43 of the single condenser unit 41 is a curved surface. The curved surface 43 has a power for converging the light and it may be a spherical surface or an aspherical surface. The curved surface 43 is arranged such that the light transmits along about the meridional plane of the single condenser unit 41.

The light passing through the opening 23 is deflected and converged by the single condenser unit 41 to be reflected by the mirror 25 (see FIG. 8). The light reflected by the mirror 25 is divided by the separator lenses 27a and 27b into two portions and they form images on different areas on the line sensor 29.

With the construction of the second embodiment, the light transmits along the meridional plane of the single condenser unit 41, which reduces the effect of the coma, matching the exit pupil of the taking lens with the entrance pupils of the focus detecting device in the same manner as the first embodiment. As a result, the actual brightness distribution can be accurately detected by the line sensor 29.

Further, the use of the single condenser unit 41 reduces number of the optical element, which eases assembling and adjustment.

The present invention can be applied to not only the focus detecting devices having a horizontal focus detection area (the opening 23) but also the device having a vertical focus detection area. In the latter case, the opening 23' is arranged in the vertical direction as shown in FIG. 10 in order to the light transmits along about the vertical meridional plane.

The present disclosure relates to the subject matter contained in Japanese Patent Application No. HEI 10-288380, filed on Oct. 9, 1998, which is expressly incorporated herein by reference in its entirety.

What is claimed is:

1. An optical system of a focus detecting device for detecting a focusing condition of a main lens with respect to an image taking plane, said device comprising:

a focus detection area arranged on an equivalent image taking plane;

a first deflecting element for deflecting the light from said main lens through said focus detection area in a first direction;

a condenser lens for converging the light deflected by said first deflecting element, said condenser lens being arranged such that the light travels along about the meridional plane of said condenser lens;

a second deflecting element for deflecting the light through said condenser lens in a second direction opposite to said first direction; and a light receiving element for receiving the light deflected by said second deflecting element.

2. The optical system of the focus detecting device according to claim 1, wherein said first deflecting element is a prism and said second deflecting element is a mirror.

3. The optical system of the focus detecting device according to claim 2, wherein said condenser lens is tilted with respect to an equivalent optical axis of said main lens such that the light deflected by said prism transmits along about said meridional plane of said condenser lens.

4. The optical system of the focus detecting device according to claim 3, wherein said prism and said condenser lens are independently arranged.

5. The optical system of the focus detecting device according to claim 1, wherein said first deflecting element and said condenser lens are combined as a single condenser unit.

6. The optical system of the focus detecting device according to claim 5, wherein one surface of said single condenser unit at the side of said focus detecting areas is a plane and the other surface thereof is a curved surface.

* * * * *